May 26, 1959      E. T. RIDGWAY      2,888,297
SELECTIVELY CONNECTIBLE AXLE FRAME FOR ROAD
VEHICLES, ESPECIALLY TRAILERS
Filed Dec. 15, 1955      2 Sheets-Sheet 1
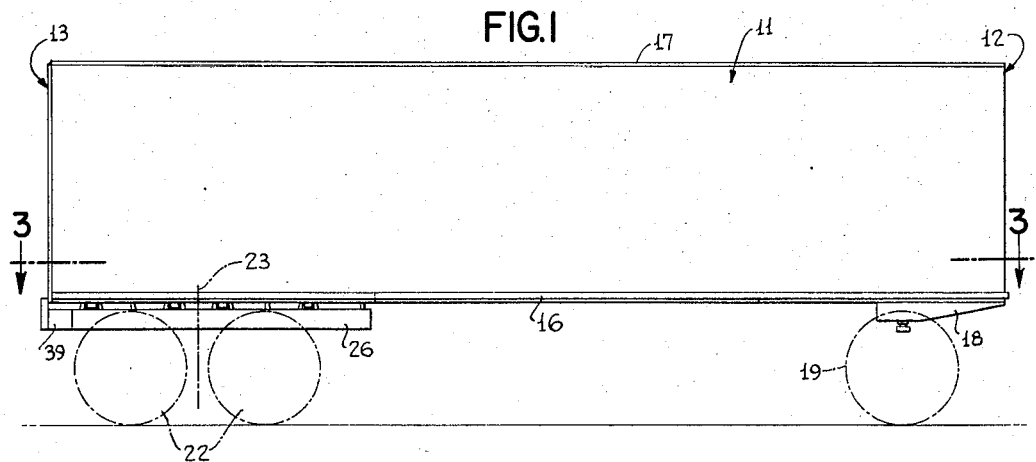
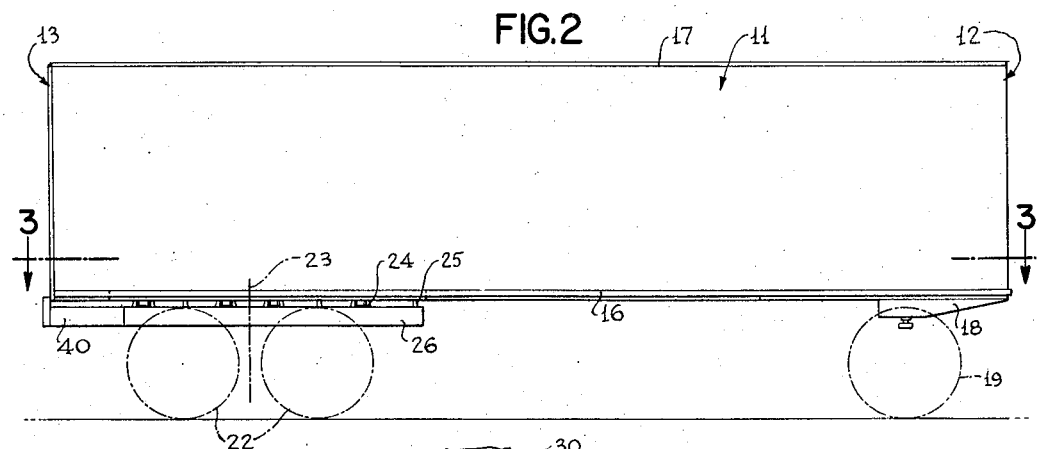
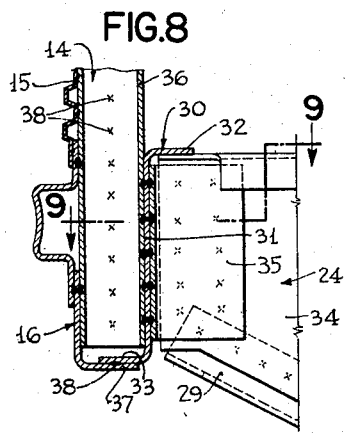
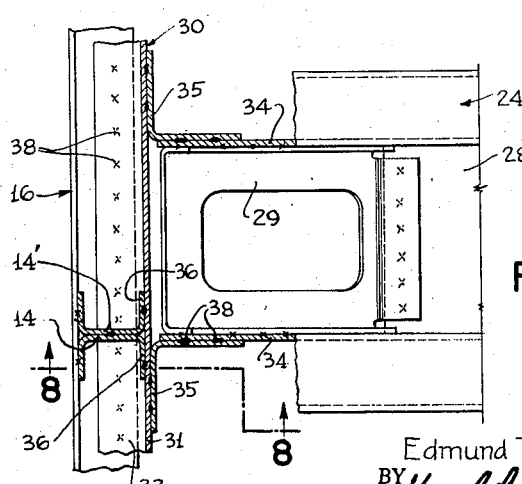
INVENTOR
Edmund T. Ridgway
BY Karl L. Schiff
AGENT May 26, 1959  E. T. RIDGWAY  2,888,297
SELECTIVELY CONNECTIBLE AXLE FRAME FOR ROAD
VEHICLES, ESPECIALLY TRAILERS
Filed Dec. 15, 1955  2 Sheets-Sheet 2
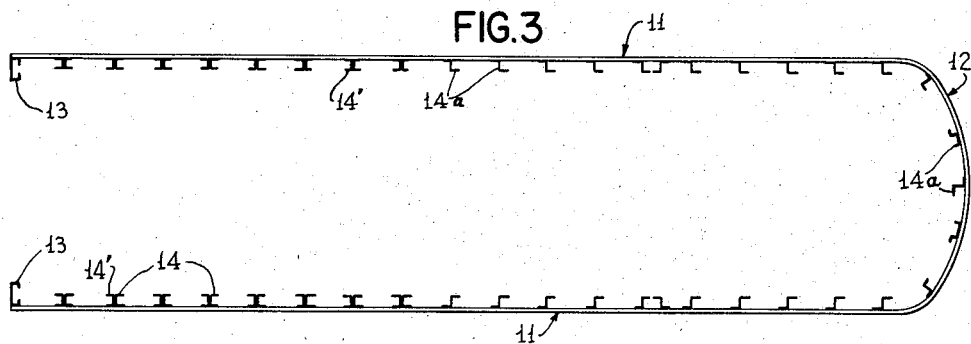
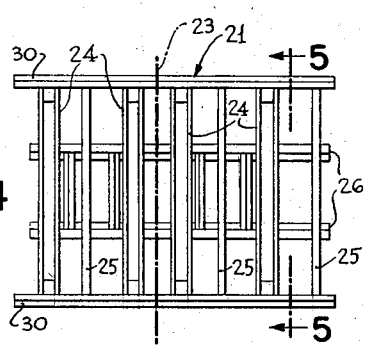
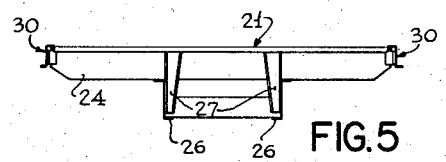
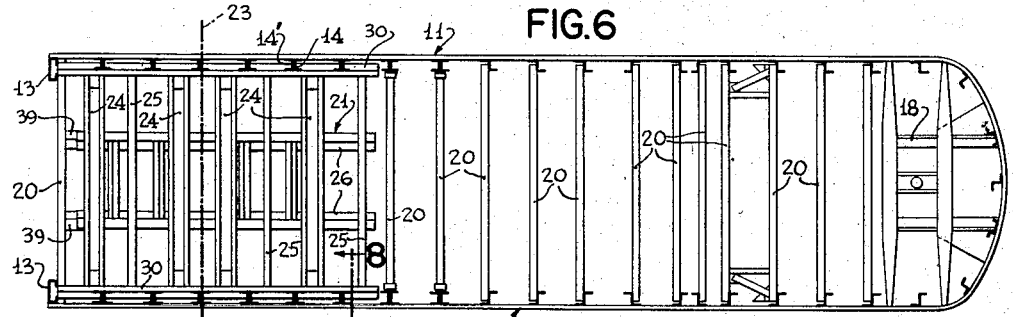
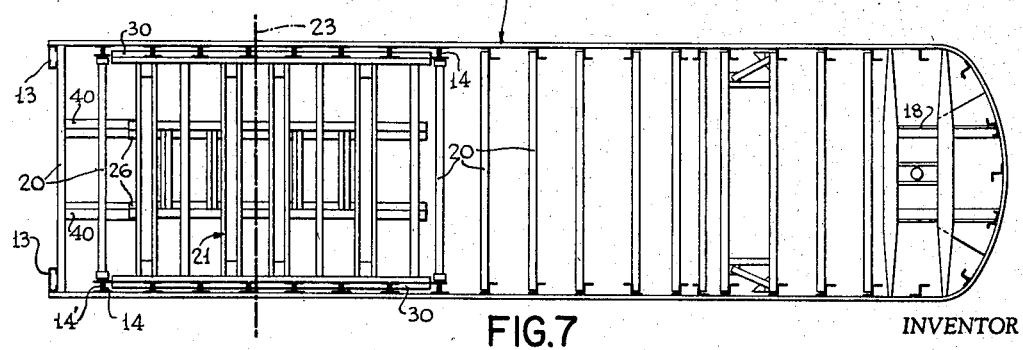
INVENTOR
Edmund T. Ridgway
BY *Karl L. Schiff*
AGENT

United States Patent Office 2,888,297
Patented May 26, 1959

2,888,297

SELECTIVELY CONNECTIBLE AXLE FRAME FOR ROAD VEHICLES, ESPECIALLY TRAILERS

Edmund T. Ridgway, Oaklyn, N.J., assignor to The Budd Company, Philadelphia, Pa., a corporation of Pennsylvania Application December 15, 1955, Serial No. 553,281

8 Claims. (Cl. 296—28)

The invention relates to a wheel supporting sub-frame of road vehicles, particularly trailers or semi-trailers, to the connection of such sub-frame with the side walls of the body of such vehicle, and to the general organization of the vehicle body related to the sub-frame.

More specifically, the invention relates to axle sub-frames and their arrangement and attachment for vehicles with large bodies of elongated prismatic shape in which side wall units are interconnected by a plurality of individual underframe beams or units, that is, the type of bodies disclosed for instance in Patent 2,172,571, R. J. Theriault, of September 12, 1939.

The present application relates to vehicles of the general type disclosed in applicant's co-pending application Serial No. 474,927 filed December 13, 1954 now abandoned, for Wheel Attachment for Vehicles Especially Trailers, as a continuation of, now abandoned, application Serial No. 237,099 filed July 17, 1951, which had the same title.

In the indicated known type of construction, it is customary to attach the underframe beams to the side walls, for instance to the webs of about equally spaced posts, and to combine a number of transverse beams into a frame unit to which the wheels with their supporting springs are attached. The locations of the side wall posts or of other structural features of a pair of given side walls determine the locations of the transverse beams and thereby the location of the axle frame and of the axles and wheels.

It is commonly known that trailers and the like of otherwise identical design and dimensions often call for a different longitudinal location of their axles so as to obtain optimum load distribution according to the nature of the cargo and so as to comply with variations in local laws or regulations.

The demand for different axle locations presents a problem, and numerous solutions thereof have been suggested. The prior solutions however mostly involve considerable complication of the vehicle structure and considerable increase of its cost and weight.

The object of the invention is a solution of the problem which means only negligible, if any, increase in weight and expense and which brings about considerable savings by permitting the use of identical standard side walls and axle frame units for vehicles differing from each other by the locations of their axles.

A salient feature of the invention resides in the introduction of longitudinal side sill members as part of the axle sub-frame unit, the sill members forming final connecting means between the sub-frame and the side walls in any selected longitudinal location. The sill members preferably have upright webs which in final assembly are secured to mating parts of the side walls, e.g., of side wall posts.

The invention has the advantage that only one pair of side frames for any height and length of a vehicle is required which nevertheless permits the connection of the side frames with axle sub-frames accommodating a wide variety of axle locations and spring suspension types now required.

The above and further features, details and advantages of the invention will become more fully apparent from the embodiment illustrated in the attached drawing and described in the following.

In the drawing:

Fig. 1 is a diagrammatic side elevation of a semi-trailer with axle frames and rear wheels in about the extreme rearward location;

Fig. 2 is a side elevation similar to Fig. 1 but with axle frame and rear wheels in a more forward location;

Fig. 3 is a diagrammatic horizontal section through the upright walls of a trailer substantially along about lines 3—3 of Figs. 1 and 2 yet prior to the connection of these walls with the underframe members;

Fig. 4 is a diagrammatic plan view of the new axle frame prior to its insertion between and connection with the trailer side walls;

Fig. 5 is a diagrammatic transverse section through the axle frame, taken along line 5—5 of Fig. 4;

Fig. 6 is a section similar to Fig. 3 but showing in plan view the underframe members after their connection with the upright walls and with the axle frame in the position corresponding to the location of frame and axles as shown in Fig. 1;

Fig. 7 is a section similar to Fig. 6 but corresponding to the location of the axle frame as shown in Fig. 2;

Fig. 8 is a fragmentary section along lines 8—8 of Figs. 6 and 9, showing on a larger scale and in greater detail the connection between axle frame and side wall; and Fig. 9 is a horizontal fragmentary section on the scale and along line 9—9 of Fig. 8.

The semi-trailer illustrated in the drawing is of the self-supporting or integral body-chassis type and presents a body of elongated generally prismatic shape. It comprises side walls 11, a front wall 12, and a rear frame 13 for doors (not shown). Side walls 11 and front wall 12 have vertical posts 14 and 14a interconnected by outer panel or skin 15, bottom side sill 16 and roof rail 17. The roof, if any, of the body is not visible.

The bottom of the trailer comprises: a front or fifth wheel unit 18, supported on a tractor, indicated in dot-and-dash lines by its rear wheel 19, and connected to side walls 11 and front wall 12; a plurality of individual transverse beams 20, secured as customary to the webs of side wall posts 14, 14a; and a rear or axle sub-frame 21 connected by (not shown) springs and other means to the tandem wheels 22 which again are diagrammatically indicated by dot-and-dash lines.

The transverse, vertical center plane between the tandem wheels 22 is indicated by heavy dot-and-dash line 23 in Figs. 1, 2, 4, 6 and 7. As evident this center plane 23 is at different locations in Figs. 1 and 6 as compared with Figs. 2 and 7.

Axle frame 21 comprises two pairs of inverted hat-section transverse beams 24 which alternate with lighter beams 25. Beams 24, 25 are interconnected by a first pair of longitudinal (inner) sill members 26 which are transversely spaced from each other and from the ends of transverse beams. The connection between beams 24, 25 and inner sill members 26 is made by overlapping flanges or webs of these members and by brackets 27 (Fig. 5). Beams 24 taper upwardly at their ends and have in these regions their bottom walls 28 formed by inserts 29.

A second pair of (outer) sill members 30, about equal in length to the inner sill members 26, interconnect the outer ends of beams 24, 25. Outer sill members 30 have a web 31, an inwardly directed upper leg 32 and an outwardly directed lower leg 33. Web 31 is connected to the vertical walls or webs 34 of beams 24, 25 by angle brackets 35.

Beams 24, 25 and sill members 26, 30 are as shown in Figs. 4 and 5, preassembled into a self-contained axle frame unit or axle sub-frame. This unit may also be preassembled with, not shown, supporting brackets and other accessories for springs, wheel guides, shock absorbers, etc.

Upon final assembly of the axle unit with the side walls 11 of the body, the webs 31 of the axle frame side sills 30 are overlappingly secured to laterally extending flanges 36 of side wall posts 14 and by lower leg 33 to inturned flange or leg 37 of side wall bottom sill 16. Posts 14 are supplemented in the attachment region of axle frame 21 with double flanges 36, the second flanges being formed on a channel or angle 14' secured to the ordinary single post 14. This supplementation provides a double line of welds (indicated at 38) between posts 14 and outer or side sill members 30.

It is now evident that the axle frame unit 21 can be secured in any longitudinal location to the side wall 11 and its posts 14 without regard to the locations of the latter. If, as shown in Figs. 1 and 6, axle frame 21 is in about its rearmost position, the number of individual transverse beams 20 in front of frame 21 is increased as compared with the more forward frame position shown in Figs. 2 and 7. In the latter case an additional individual transverse beam 20 is inserted between axle frame 21 and the rear frame 13.

The space between the ends of sills 26 of the axle frame and the rearmost transverse beam 20 may be bridged by inserts 39 or 40, respectively, so that collision impacts are directly transferred into axle frame 21 and through it distributed over a great area of side walls 11.

The invention is not restricted to the illustrated embodiment and its details but is susceptible to modifications and adaptations which may be dictated by the characteristics of the construction of the body to which the invention is to be applied, by the type of wheel suspension, or by the number of axles and wheels.

What is claimed is:

1. In a self-supporting body of elongated generally prismatic shape for road vehicles such as highway trailers: a bottom structure having longitudinally spaced, transverse beams; side walls forming main load-supporting structures of the body and including longitudinally spaced upright posts and lower longitudinally extending side sills, said side sills extending over substantially the entire length of the vehicle, said side walls being interconnected by said beams; a pair of longitudinal sill members of a length substantially shorter than said side sills being secured to the ends of some only of said transverse beams and forming therewith an axle frame, said sill members engaging and being connected with a plurality of said posts and with said sills in any one of alternative longitudinal locations along the length of said body.

2. In a vehicle bottom structure of a self-supporting vehicle body of elongated generally prismatic shape: two groups, a first group and a second group, of longitudinally spaced beams extending across the width of the structure; side wall members having vertical posts, extending over substantially the entire length of the vehicle, and interconnecting the ends of the beams of said first group; a first pair of longitudinal sill members of a length substantially shorter than said side wall members, said sill members being spaced from each other, from the longitudinal center line of the vehicle and from said side wall members, said sill members being arranged beneath and secured to the beams of said second group, said sill members extending through and being substantially confined to at least one running gear attachment zone; the beams of said second group having their ends interconnected by a second pair of sill members of about the same length as the sill members of said first pair, the sill members of said second pair having vertical webs overlappingly engaging and connected with longitudinally extending flanges of said posts; said sill members and the beams of the second group forming a preassembled axle sub-frame and said side walls with their said posts forming side wall sub-assemblies, said sub-frame and said side wall sub-assemblies permitting final connection with each other in different relative longitudinal positions.

3. In a self-supporting body of elongated generally prismatic shape for road vehicles such as highway trailers: a bottom structure having longitudinally spaced, transverse beams; side walls forming main load-supporting structures of the body and including longitudinally spaced upright posts and lower longitudinally extending side sills, said side sills extending over substantially the entire length of the vehicle, having a web secured to the outside of said posts, and having an inturned flange along their lower margin below the lower ends of said posts, said side walls being interconnected by said beams; a pair of longitudinal sill members of a length substantially shorter than said side sills being secured to the ends of some only of said transverse beams and forming therewith an axle frame, said sill members having an upright web engaging and being connected with a plurality of said posts and having an outturned flange along their lower margins overlappingly secured to said inturned flange of said sills; the axle frame being secured through its sill members to said side walls in any one of alternative longitudinal locations along the length of said body.

4. In a self-supporting body of elongated generally prismatic shape for road vehicles such as highway trailers: a bottom structure having a plurality of individual longitudinally spaced, transverse beams; side walls forming main load-supporting structures of the body, including longitudinally spaced upright posts, and extending over substantially the entire length of the vehicle; said individual beams having their ends secured to said posts thereby interconnecting said side walls; a pair of longitudinal sill members of a length substantially shorter than said side walls being secured to the ends of some further transverse beams and forming therewith an axle frame, said sill members engaging and being connected with the inside of a plurality of said posts in any one of alternative longitudinal locations along the length of said body.

5. In a vehicle bottom structure of a self-supporting vehicle body of elongated generally prismatic shape: longitudinally spaced transverse beams extending across the width of the structure; side wall members having vertical posts and extending over substantially the entire length of the vehicle; a pair of longitudinal sill members of a length substantially shorter than said side wall members; said beams having their ends interconnected by said sill members, the latter having webs overlappingly engaging and connected with longitudinally extending flanges of said posts; said sill members and beams forming a preassembled axle sub-frame and said side walls with their said posts forming side wall sub-assemblies, said sub-frame and said side wall sub-assemblies permitting final connection with each other in different relative longitudinal positions.

6. In a self-supporting vehicle body of elongated generally prismatic shape: side walls having vertical posts and extending over substantially the entire length of the vehicle; an axle sub-frame structure extending across the width of the body and being substantially shorter than said side walls; said sub-frame structure having longitudinal sill members, said sill members overlappingly engaging and being connected with longitudinally extending flanges of said posts; said axle sub-frame forming a preassembled unit and said side walls with their said posts forming side wall sub-assemblies; said sub-frame and said side wall sub-assemblies permitting final connection with each other in different relative longitudinal positions.

7. In a vehicle body according to claim 6, said posts having a longitudinal directed flange along their outer margin, said posts being connected with a supplementary post member, the latter providing a second flange directed oppositely to said first flange, said sill members being connected with both said first and second flanges.

8. In a self-supporting vehicle body of elongated generally prismatic shape: side walls extending over substantially the entire length of the vehicle; an axle sub-frame structure extending across the width of the body and being substantially shorter than said side walls; said sub-frame structure having longitudinal sill members, said sill members overlappingly engaging and being connected with said side walls; said axle sub-frame forming a pre-assembled unit and said side walls with their said posts forming side wall sub-assemblies; said sub-frame and said side wall sub-assemblies permitting final connection with each other in different relative longitudinal positions.

References Cited in the file of this patent
UNITED STATES PATENTS

| | | |
|---|---|---|
| 2,172,571 | Theriault | Sept. 12, 1939 |
| 2,268,167 | Raine | Dec. 30, 1941 |
| 2,332,326 | Lex | Oct. 19, 1943 |
| 2,606,769 | De Lay | Aug. 12, 1952 |
| 2,676,815 | Bennett | Apr. 27, 1954 |